UNITED STATES PATENT OFFICE.

ADOLFO POUCHAIN, OF TURIN, ITALY.

PROCESS OF MAKING NEGATIVE ELECTRODES FOR ELECTRIC ACCUMULATORS.

1,366,489.    Specification of Letters Patent.    Patented Jan. 25, 1921.

No Drawing. Original application filed September 18, 1919, Serial No. 324,658. Divided and this application filed February 13, 1920. Serial No. 358,351.

*To all whom it may concern:*

Be it known that I, ADOLFO POUCHAIN, a subject of the King of Italy, and resident of Turin, Italy, have invented certain new and useful Processes of Making Negative Electrodes for Electric Accumulators, of which the following is a specification.

This invention relates to zinc negative electrodes for electric accumulators and has for its object a method for making said electrodes by coating a core or supporting plate of conducting material with a layer of zinc, the present case being a division of my prior application filed September 18, 1919, Serial No. 324,658.

The process according to this invention consists in placing said core or supporting plate into a bath of salts of zinc, preferably with addition of salts of mercury and magnesium and causing an electric current to flow through said bath, the core or supporting plate to be coated with zinc acting as a cathode.

The preferred manner of putting into practice this process is hereinafter described: the core or supporting plate, which as above stated is made of conducting material, is placed in a bath containing zinc sulfate, mercuric sulfate and magnesium sulfate, and an electric current is passed through said bath, the core or supporting plate to be coated with zinc being inserted as a cathode in said bath.

By this treatment a very thin layer or skin of mercury with magnesium is obtained on the plate and then there is deposited the zinc in a granular state.

When the zinc deposit is about a millimeter thick, the plate is ready for use as a negative electrode in electric accumulators.

Instead of subjecting the supporting plate or core directly to the treatment in the aforesaid bath, it may be first covered with a very thin layer of copper, such as by electro-deposition.

The composition of the bath which has been found to give satisfactory results is as follows: five parts of zinc sulfate, one part of mercuric sulfate and one part of magnesium sulfate; however it is to be understood that this invention is not confined to the above-stated composition of the bath, said composition being adapted to be modified within certain ranges.

Similarly this invention is not confined to above named salts of zinc, mercury and magnesium as other salts of said metals may be used.

The form or shape of the cores or supporting plates may be any that is desired and the same may be made of any preferred material, it being only essential that said material is a good conductor of electric current.

What I claim as my invention and desire to secure by United States Letters Patent is:—

1. A method of making negative electrodes for electric accumulators, consisting in placing a core of conducting material in a bath containing salts of zinc, mercury and magnesium; and passing an electric current through the bath while utilizing said core as the cathode.

2. A method of making negative electrodes for electric accumulators, consisting in placing a core of retort carbon in a bath containing salts of zinc, mercury and magnesium; and passing an electric current through said bath while utilizing said core as the cathode.

3. A method for making negative electrodes for electric accumulators, consisting in coating a core of retort carbon with a very thin layer of copper; placing the coated core in a bath containing salts of zinc, mercury and magnesium; and passing an electric current through said bath while utilizing said core as the cathode.

Signed at Turin, Italy, this 21 Jan., 1920.

ADOLFO POUCHAIN.